(12) United States Patent
Bendixen et al.

(10) Patent No.: US 8,385,626 B2
(45) Date of Patent: Feb. 26, 2013

(54) REPLACEMENT OF BUILD TO ORDER PARTS WITH POST CONFIGURED IMAGES IN ANY MANUFACTURING ENVIRONMENT

(75) Inventors: Rudolf V. Bendixen, Austin, TX (US); Tad S. Goodwin, Dripping Springs, TX (US); Timothy J. Taylor, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 519 days.

(21) Appl. No.: 12/640,153

(22) Filed: Dec. 17, 2009

(65) Prior Publication Data

US 2011/0150315 A1    Jun. 23, 2011

(51) Int. Cl.
*G06K 9/00* (2006.01)

(52) U.S. Cl. .................... 382/141; 382/154

(58) Field of Classification Search ............... 382/141, 382/154, 285, 302–308, 325; 717/168–178
See application file for complete search history.

(56) References Cited

U.S. PATENT DOCUMENTS

| 2005/0172280 A1* | 8/2005 | Ziegler et al. ........... 717/168 |
| 2011/0055714 A1* | 3/2011 | Vemulapalli et al. ..... 715/739 |

OTHER PUBLICATIONS http://wiki.python.org/moin/BeginnersGuide/Overview, printed Dec. 1, 2009.

* cited by examiner

*Primary Examiner* — Tri T Ton
(74) *Attorney, Agent, or Firm* — Hamilton & Terrile, LLP; Stephen A. Terrile

(57) ABSTRACT

An embedded imaging system for addressing burn rack time issues. The embedded imaging system focuses on flexibility, control, and the ability to run without manufacturer specific IT capabilities (which allows the use of the embedded imaging system at outside manufacturing facilities).

10 Claims, 10 Drawing Sheets

```
<rxiw version= 1.0 encoding= uu-o ? >
-- <EmbeddedImage Image ID="RetailImage1" Status="Active"
InvalidDate="1/1/2009">
    - <MatchingCriteria>
      - <ORCondition>
        - <INFOPart>
<INFONumber>23456</INFONumber>
<INFODescription>Staples Order</INFODescription>
</INFOPart>
-- <INFOPart>
    <INFONumber>34567</INFONumber>
    <INFODescription>Walmart Order</INFODescription>
    </INFOPart>
</ORCondition>
- <ORCondition>
  -- <INFOPart>
<INFONumber>12345</INFONumber>
<INFODescription>Vista INFO Parte/INFODescription>
</INFOPart>
-- <EnvironmentVariable>
   <VariableName>OS</VariableName>
   <VariableValue>V32</ VariableValue>
</EnvironmentVariable>
</ORCondition>
- <ANDCondition>
-- <EnvironmentVariable>
    <VariableName>OSL</VariableName>
    <VariableValue>ENG</VariableValue>
</EnvironmentVariable>
-- <EnvironmentVariable>
    <VariableName>MFGSITE</VariableName>
    <VariableValue>AMF,EMF</VariableValue>
</EnvironmentVariable>
-- <EnvironmentVariable>
<VariableName>LOB</VariableName>
< VariableValue>NOTEBOOK</VariableValue >
```

*Figure 5A*

```
</EnvironmentVariable>
-- <SRV>
  <SRVNumber>12345</SRVNumber>
  <SRVDescription>Vista English Home Premium</SRVDescription>
</SRV>
-- <SRV>
<SRVNumber>67890</SRVNumber>
<SRVDescription>English Office</SRVDescription>
</SRV>
- <SRV>
<SRVNumber>34821</SRVNumber>
<SRVDescription>ATI Video Driver</SRVDescription>
</SRV>
</ANDCondition>
</MatchingCriteria >
- <Removals>
  - <SRVs>
    - <SRV>
       <SRVNumber>12345</SRVNumber>
<SRVDescription>Vista English Home Premium</SRVDescription>
</SRV>
- <SRV>
  <SRVNumber>67890</SRVNumber>
  <SRVDescription>English Office </SRVDescription>
  </SRV>
</SRVs>
</Removals>
- <Additions>
  - <SRVs>
    - <SRV>
       <SRVNumber>34567</SRVNumber>
       <SRVDescription>EI Retail Config 1</SRVDescription>
       </SRV>
</SRVs>
</Additions>
</EmbeddedImage>
```

*Figure 5B*

REPLACEMENT OF BUILD TO ORDER PARTS WITH POST CONFIGURED IMAGES IN ANY MANUFACTURING ENVIRONMENT

FIELD OF THE INVENTION

The present invention relates to information handling systems and more particularly to the replacement of build to order parts with post configured images in any manufacturing environment.

DESCRIPTION OF THE RELATED ART

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

As operating systems (such as the Windows operating system available from Microsoft Inc.) grow in complexity and size, the time it takes to set-up and install build to order software stacks on customer's machines takes longer and longer. This can limit a manufacture's ability to meet through put requirements and potentially could result in higher costs at outside development manufacturers (ODMs) that are fulfilling systems for the manufacturer.

It can be challenging to reduce set-up time while keeping a build to order capability and as well as out of box customer experience. To address the issue of long set-up times, one attempted solution involved the creation of post-configured images of certain operating system and application combinations that were a high take rate had high attach rates. With this solution, a deployment team determined what images with to create. An information technology (IT) system was built to manage substitution of a standard operating system image with one of the post configured images if the software parts in the order matched the post configured image. By including the applications in a post-configured state, the time to install those applications was eliminated from the burn rack.

This known solution has a number of issues that prevented the solution from being widely utilized. For example, the solution often required real-time data on high take application installs. Also, the solution often had manufacturer specific IT requirements which limited the use of the solution to particular manufacturer specific factories. Also, the solution did not have controls in place to limit the utilization. Once the solution was turned on for a line of business, every system being manufactured for that line of business was open to the image substitution engine. Also, the solution did not have any controls in place to end of life an image, so stale images could potentially be installed on a customer's system.

SUMMARY OF THE INVENTION

In accordance with the present invention, an embedded imaging system is disclosed for addressing burn rack time issues. The embedded imaging system focuses on flexibility, control, and the ability to run without manufacturer specific IT capabilities (which allows the use of the embedded imaging system at ODM facilities).

More specifically, the embedded imaging system creates post-configured images that contain the operating system and other software installs to reduce the time of setup of this installs in the burn rack. The embedded imaging system makes use of a request from manufacturing or from platform/marketing or retail sales teams depending on the situations. This request ensures that teams aware of real impacts are making the requests, rather than depending on guesses. The manufacturing teams use their build data to project where they may need an embedded image. The platform/marketing and retail sales teams have advance knowledge of when any large retail builds are planned. These retail builds are an excellent opportunity for embedded imaging. Because retail builds usually contain large numbers of a single configuration, a single embedded image can be generated that contains all possible software in a post-configurated state (note: some software cannot be installed in a post configured stare). When the request has been received by the embedded imaging system, an automated download process creates an embedded image. Embedded Image Python scripts perform all of the actions to create an image. A Python script is a small program that can be executed using a Python interpreter to execute commands.

The build to order download is executed, certain operating system customizations are skipped during this process, certain files are cleaned from the system, and a Windows Imaging (WIM) File of the embedded image is created and posted to a server. A Windows Imaging File format is a collection of files bound together in a single file. The WIM file formal uses known technology to compress the size of the overall file package. This image is used as the replacement of the standard operating system image if an order matches the appropriate criteria.

Additionally, a script is generated to handle the application of the embedded image. Also in certain embodiments, an XML file is updated with the details of the image substitution of the embedded image. Also in certain embodiments, an XML file is updated with the details of the image substitution criteria. This XML file allows the embedded image to be used in very specific cases. Also, the XML indicates the status of the image and the date at which the image becomes invalid. This indication ensures that stale images do not accidentally get deployed to customer systems. Next, the image and the update XML are promoted to factories via an Automated File Promotion (AFP) (i.e., a tool that is used to move files to different levels on a download server) or included in a build to order anywhere (BTOA) package (i.e., a process which encapsulates a factory process into a portable mechanism which allows ODMs to generate substantially build to order results) delivered to an ODM.

The software download process updates compare the contents of an order against the XML file to determine whether a match is made. If so, the process makes any necessary adds and deletes from the SDR to allow for the embedded image to function properly. Such a system minimizes the need for costly IT infrastructure and allows for a streamlined process for updates. In a retail order configuration example, one result is a greater time savings, because the embedded image can be built to include a larger set of software than systems that guessed based on high take rate data. The embedded image process can be used in both internal dedicated manufacturing facilities as well as outside manufacturers (OMs), so it is a solution that can work well regardless of manufacturing model.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIGS. 5A and 5B show an example XML file for the embedded imaging system.

DETAILED DESCRIPTION

Figure 1:
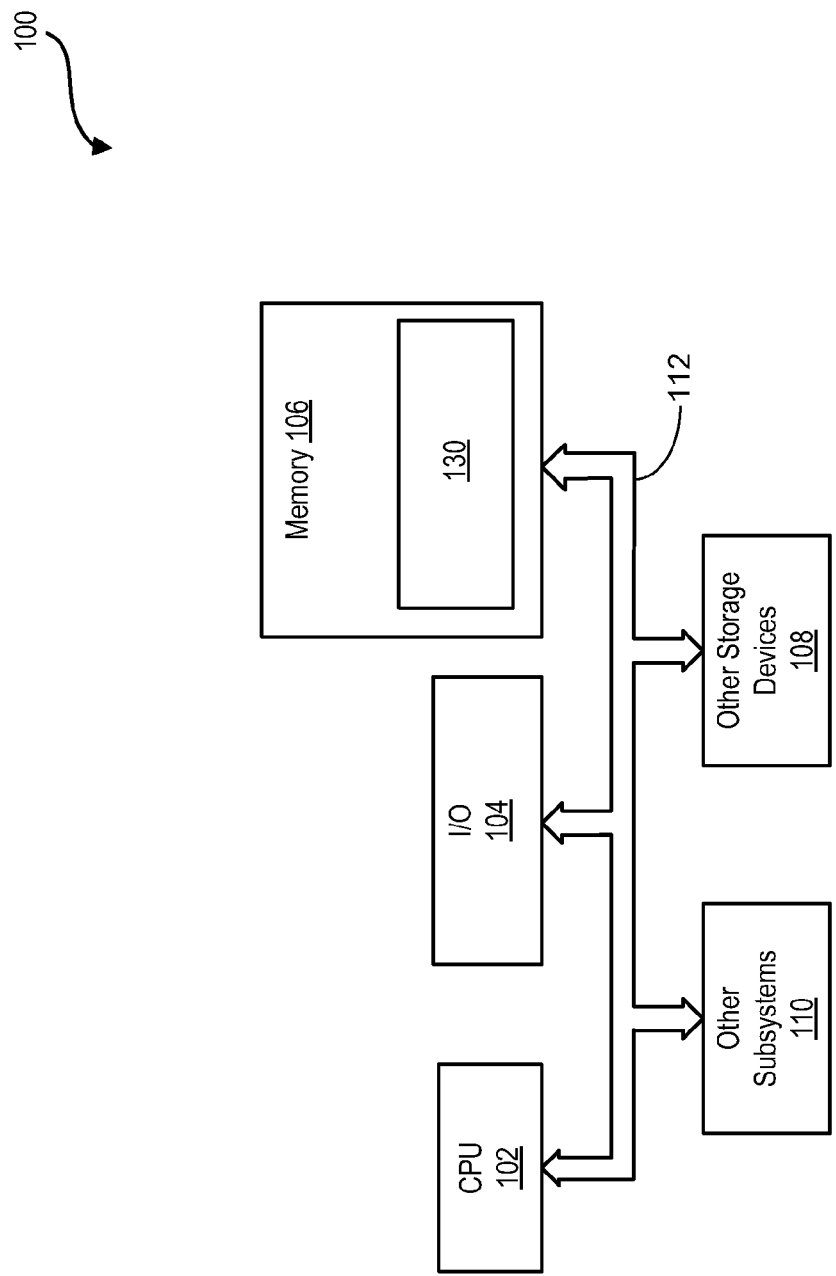
FIG. 1 shows a system block diagram of an information handling system.

Referring briefly to FIG. 1, a system block diagram of an information handling system 100 is shown. The information handling system 100 includes a processor 102, input/output (I/O) devices 104, such as a display, a keyboard, a mouse, and associated controllers (each of which may be coupled remotely to the information handling system 100), a memory 106 including volatile memory such as random access memory (RAM) and non-volatile memory such as a hard disk and drive, and other storage devices 108, such as an optical disk and drive and other memory devices, and various other subsystems 110, all interconnected via one or more buses 112.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 2:
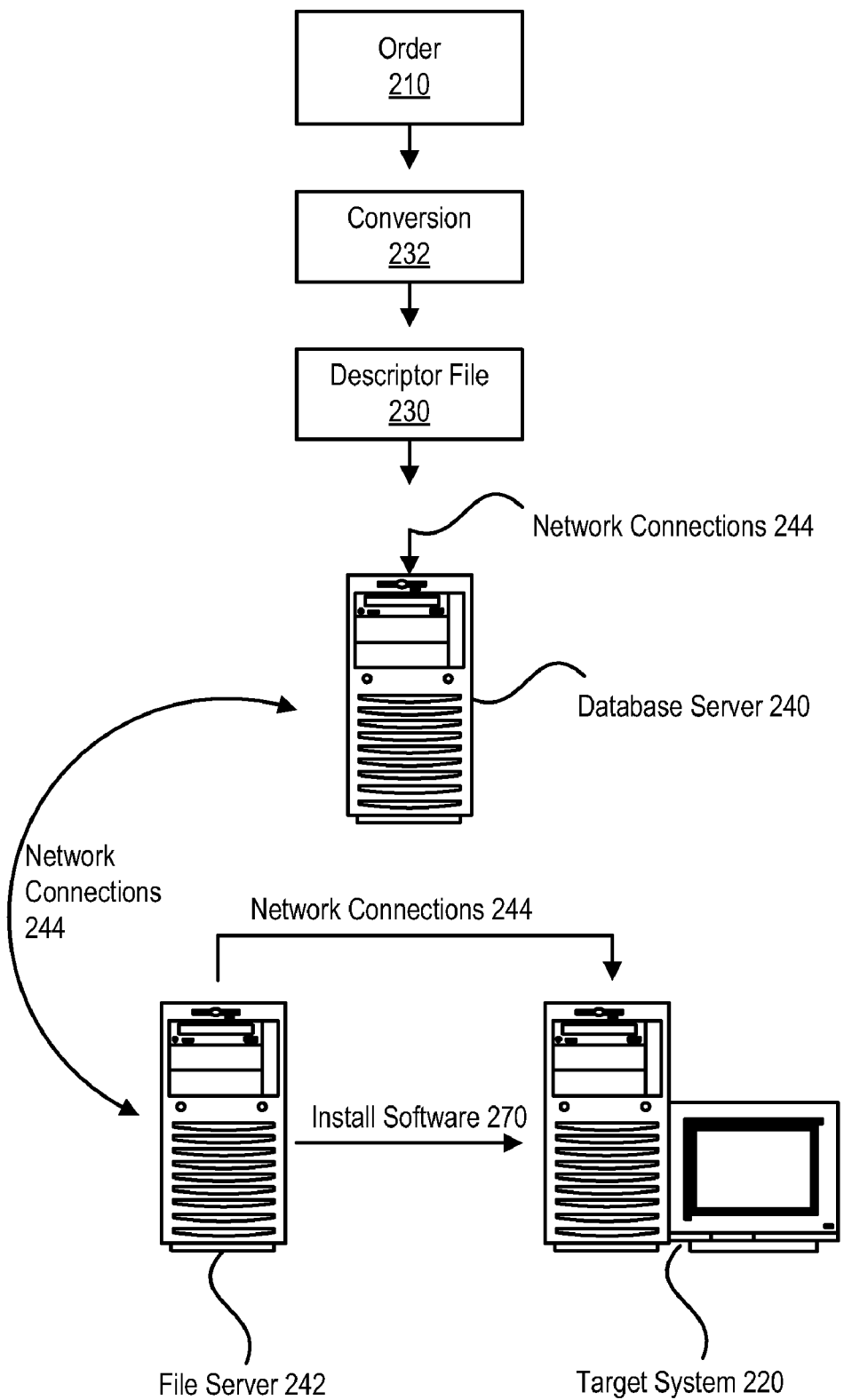
FIG. 2 shows an example of an automated build to order system for installing software on an information handling system.
Figure 3A:
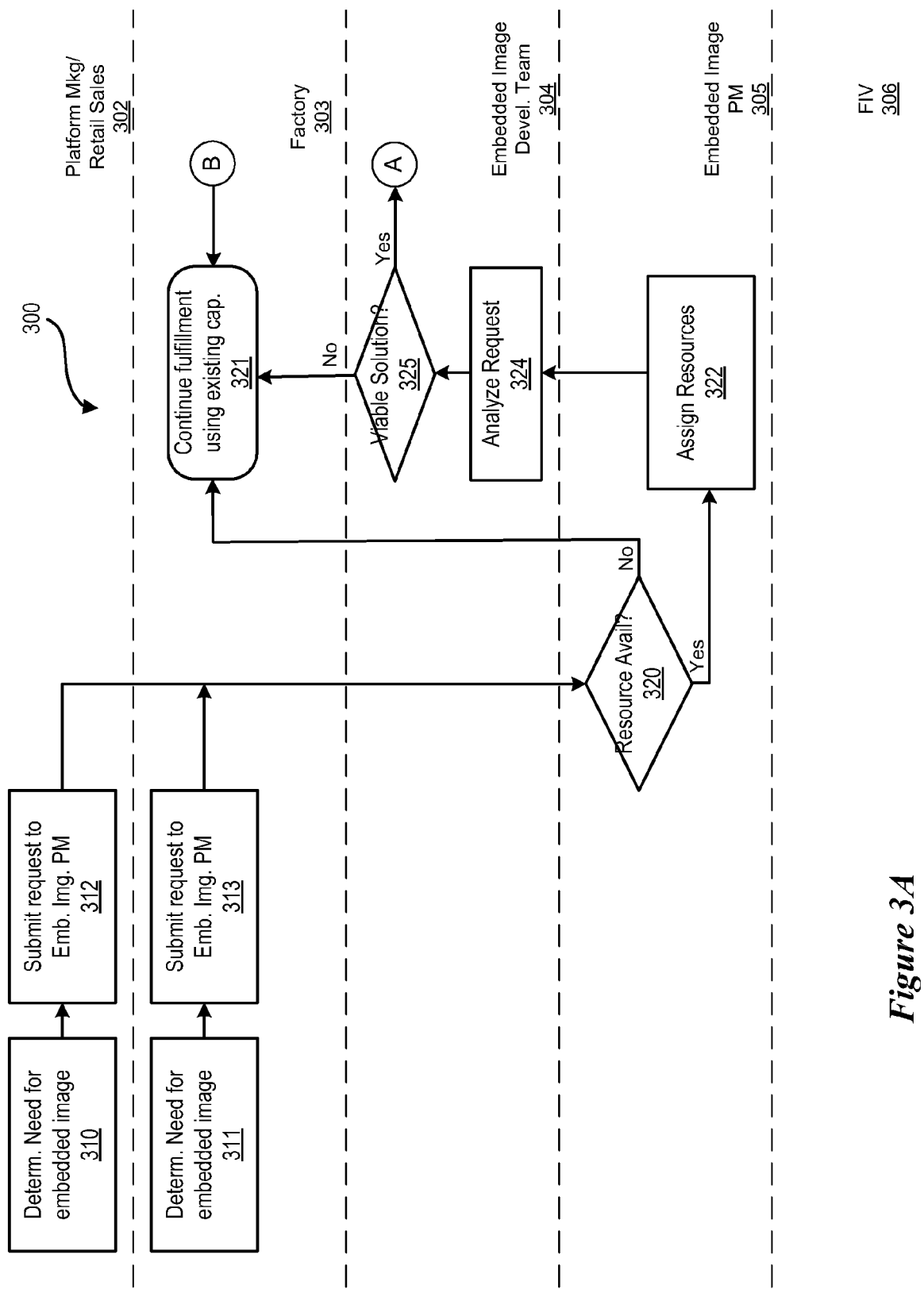
FIGS. 3A-3D show a flow chart of the operation of an embedded imaging request, creation and delivery system.
Figure 3B:
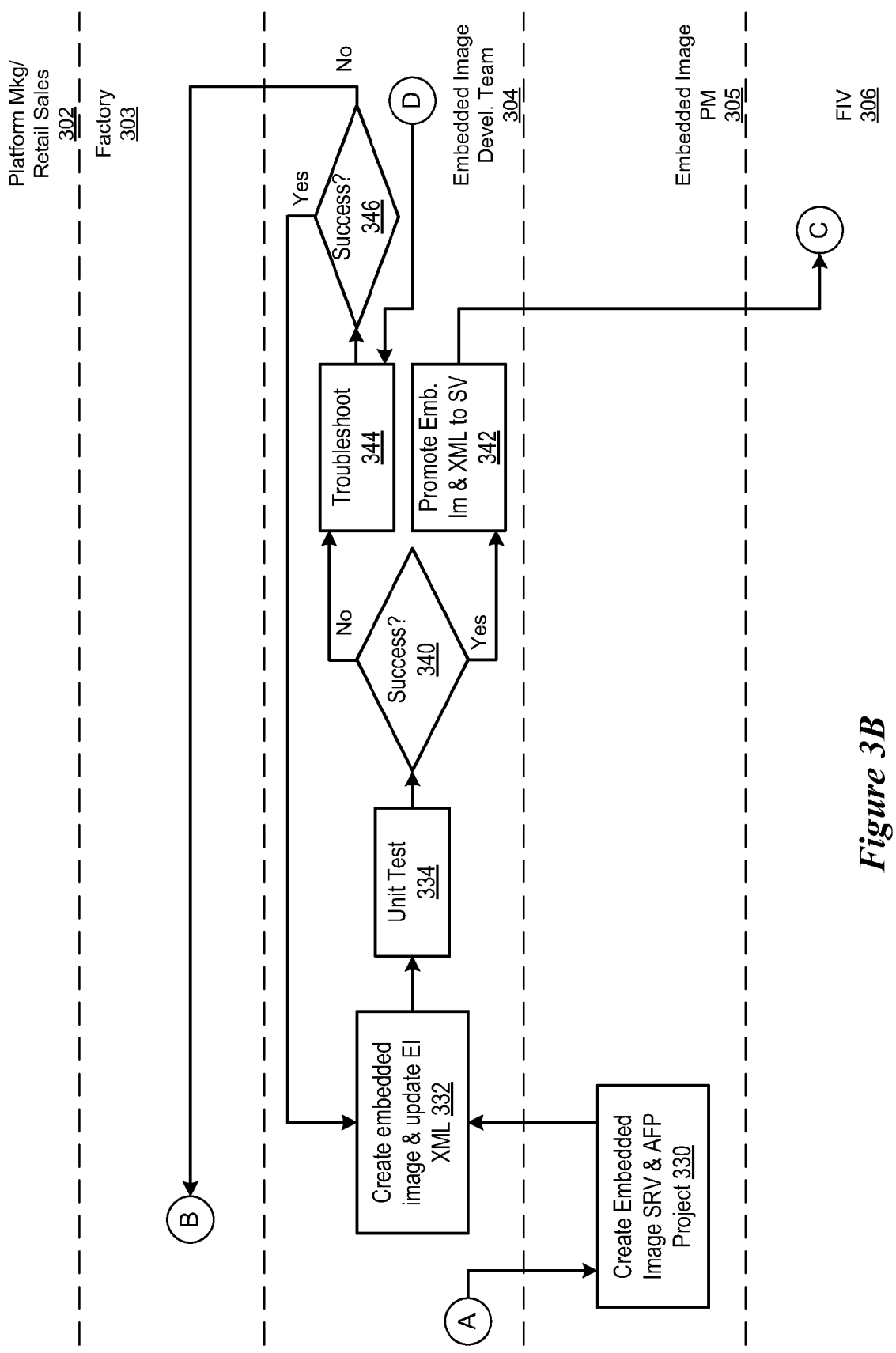
Figure 3C:
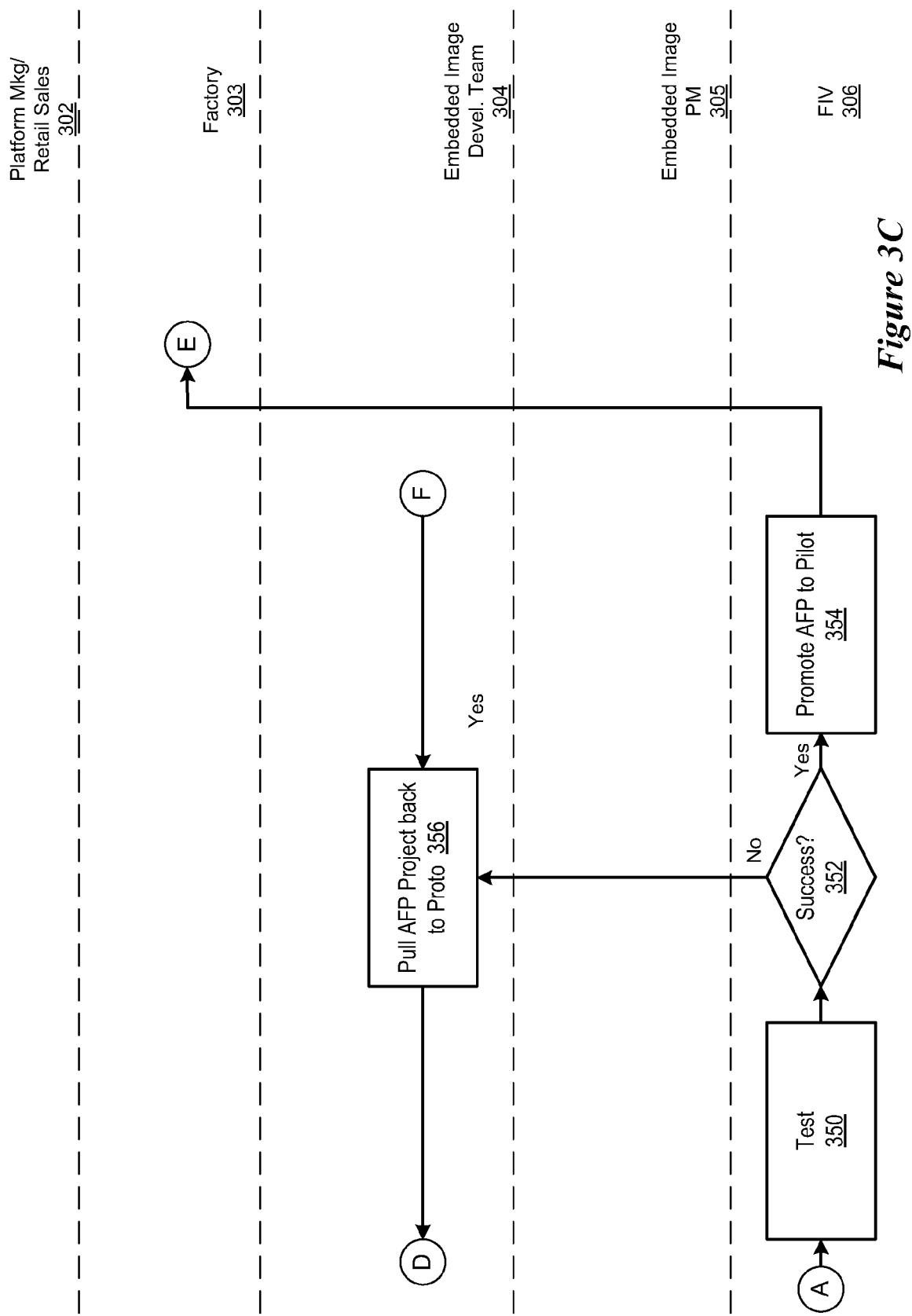
Figure 3D:
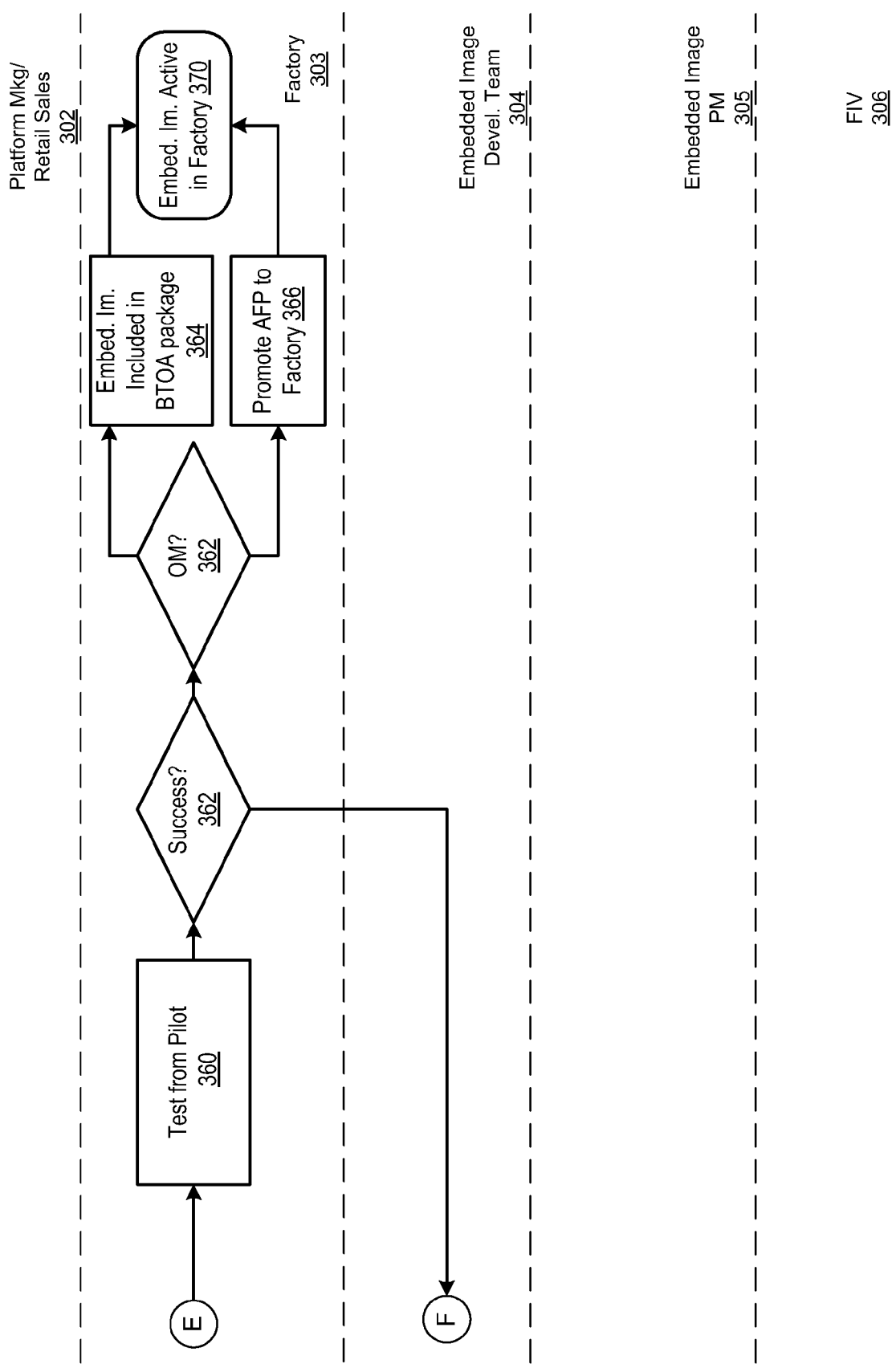

Referring to FIG. 2, a schematic diagram of a software installation system 200 at an information handling system manufacturing site is shown. In operation, an order 210 is placed to purchase a target information handling system 220 (e.g., the information handling system 100). The target information handling system 220 to be manufactured contains a plurality of hardware and software components. For instance, target information handling system 220 might include a certain brand of hard drive, a particular type of monitor, a certain brand of processor, and software. The software includes a particular version of an operating system along with all appropriate driver software and other application software along with appropriate software bug fixes. The software also includes ordered subscription software along with an associated key creation utility.

Before target information handling system 120 is shipped to the customer, the plurality of components are installed and tested from, for example, a fixed image of the software. Such software installation and testing advantageously ensures a reliable, working information handling system which is ready to operate when received by a customer.

Because different families of information handling systems and different individual computer components require different software installation, it is necessary to determine which software to install on a target information handling system 220. A descriptor file 230 (e.g., a system descriptor record (SDR)) is provided by converting an order 210, which corresponds to a desired information handling system having desired components, into a computer readable format via conversion module 232.

Component descriptors are computer readable descriptions of the components of target information handling system 220 which components are defined by the order 210. In a preferred embodiment, the component descriptors are included in a descriptor file called a system descriptor record which is a computer readable file containing a listing of the components, both hardware and software, to be installed onto target information handling system 220. Having read the plurality of component descriptors, database server 240 provides a plurality of software components corresponding to the component descriptors to file server 242 over network connection 244. Network connections 244 may be any network connection well-known in the art, such as a local area network, an intranet, or the internet. The information contained in database server 240 is often updated such that the database contains a new factory build environment. The software is then installed on the target information handling system 220. The software installation is controlled by a software installation management server that is operable to control the installation of the operating system and other software packages specified by a customer.

Referring to FIGS. 3A-3D, a flowchart of the operation of an embedded imaging request, creation and delivery system is shown. The embedded imaging request, creation and delivery system 300 includes a platform marketing and retail sales portion 302, a factory portion 303, an embedded image development team portion 304, an embedded image project management (PM) portion 305 and a Factory Install Validation (FIV) portion 306. A FIV tests the integration of factory installed software on a manufacturer download process.

The embedded imaging request, creation and delivery system begins operation with a determination of a need for an embedded image within the platform marketing and retail sales portion 302 of the system at step 310 or within the factory portion of the system at step 311. The determination may be made by analyzing data such as sales data or order data that is obtained via and stored on an information handling system such as the information handling system 100. The determination may further be made by a program executing on an information handling system in response to analyzing the data. Next, the system 300 automatically submits a request to an embedded image project manager portion at step 312 for the platform marketing and retail sales portion and at step 313 for the factory portion 303.

Next, at step 320, a determination is made by the system regarding whether resources are available for generating the embedded image within the embedded image project management portion 305. If it is determined that resources are not available, then the system continues to perform image fulfillment operations using existing capabilities within the factory portion 303. If it is determined that resources are available, then the request is analyzed at step 324 to determine whether an embedded image is a viable solution to the submitted request at step 325. An embedded image is a viable solution if the configuration contains software components that can be pre-setup and applied to multiple systems. Some software installs capture system specific information, so they can not be pre-installed and then images to multiple systems. If it is determined that an embedded image is not a viable solution then the system continues to perform image fulfillment operations using existing capabilities within the factory portion 303.

If it is determined that an embedded image is a viable solution, then at step 330 an embedded image software release vehicle (SRV) and AFP project are created within the embedded image project management portion 305. The software release vehicle is also referred to as a software part. Next, at step 332, an embedded image is created and an Embedded image Extensible Markup Language (EI XML) file is updated within the embedded image development team portion 304 of the system 300. Using an EI XML file allows for the use of standard tools for reading the data from the file. Next, a unit test is performed on the embedded image and updated EI XML file at step 334. The system 300 then determines whether the embedded image and updated EI XML file test was successful at step 340. If the test was successful, then the embedded image and updated XML file are promoted to Software Validation (SV) at step 342. Software Validation is a directory level within certain download servers that is used by test groups for their validation efforts prior to promoting the software to a factory environment. If the test was not successful then a trouble shooting operation is performed at step 344 and a determination is made whether the troubleshooting was successful at step 346. If the troubleshooting operation was not successful, then the operation returns to perform image fulfillment operations using existing capabilities within the factory portion 303. If the troubleshooting operation was successful, then the system returns to step 332 where an embedded image is created and an EI XML file is updated.

After the embedded image and updated XML file are promoted, the system proceeds to the FIV portion 306 where the embedded image and the updated XML file are tested at step 350. If the test is successful, as determined at step 352, then the system promotes the AFP to a pilot program at step 354. If the test was not successful, then the system returns to the embedded image development team portion 304 where the embedded image and the updated XML file are pulled from the AFP project and are returned to a prototype stage for troubleshooting at step 344.

After the embedded image and updated XML file are promoted to the pilot program, then the system proceeds to the factory portion 303 where the system performs a test on the pilot program at step 360. If the test is successful, as determined by step 362, then the system analyzes the embedded image and updated XML file to determine whether the embedded image and updated XML file are to be used within an outside manufacturer at step 362. If the embedded image and updated XML file are to be used within an outside manufacturer, then the system includes the embedded image and updated XML file within a build to order anywhere (BTOA) package at step 364. If the embedded image and updated XML file are to be used within an internal factory, then the system 300 promotes the AFP to the factory at step 366. In either case, at step 370 the embedded image and updated XML file is activated in the factory (either internally or externally).

Figure 4A:
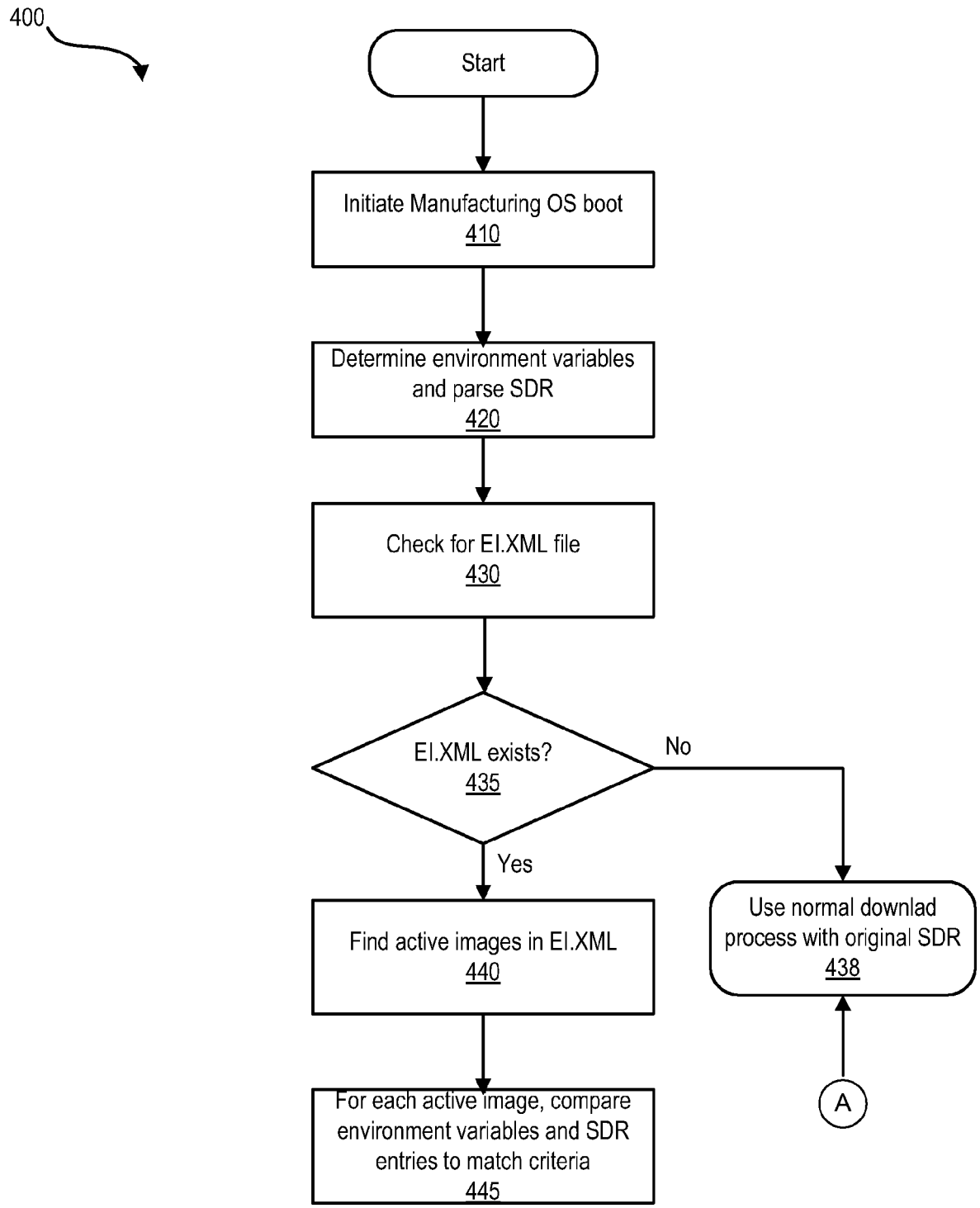
FIGS. 4A and 4B show a flow chart of the operation of an embedded image substitution process.
Figure 4B:
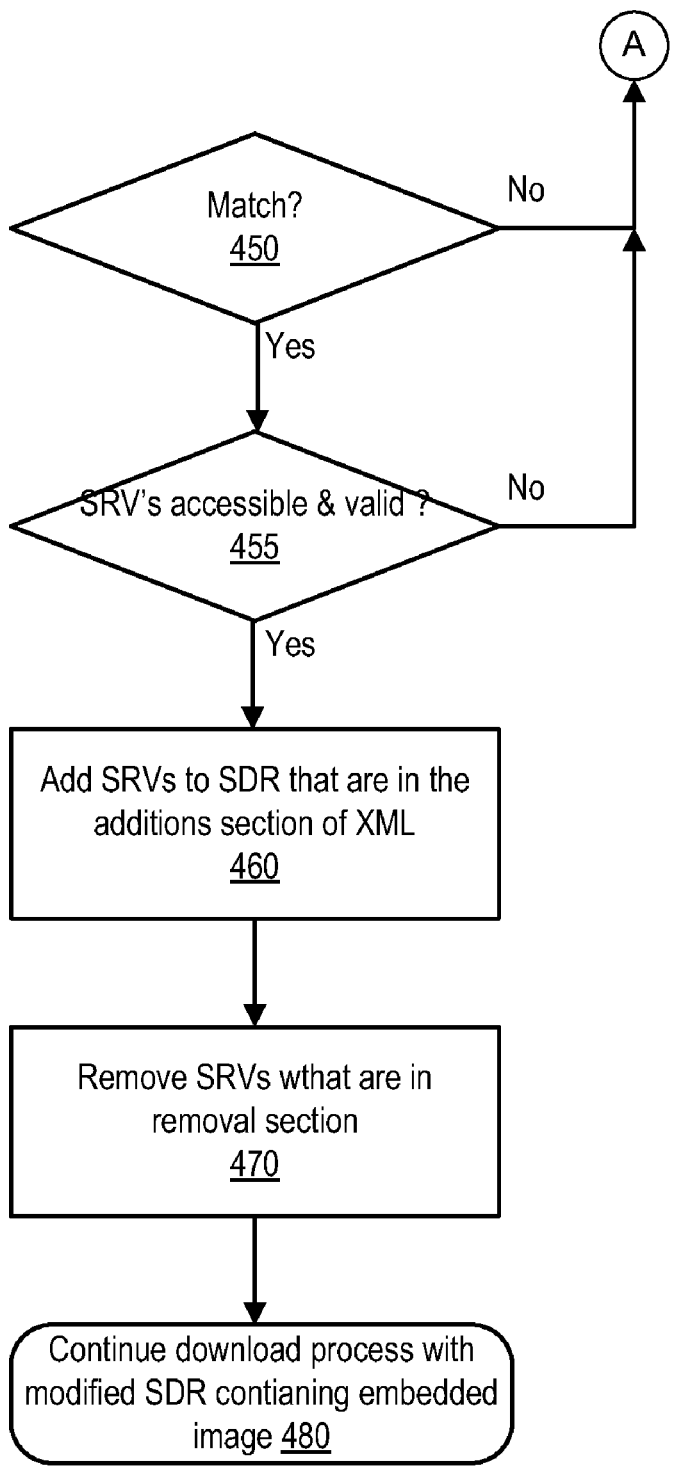

Referring to FIGS. 4A and 4B, a flow chart of the operation of an embedded image substitution system 400 is shown. More specifically, the embedded image substitution process starts operation by initiating a manufacturing operating system boot operation at step 410 (e.g., via a VistaPE manufacturing OS boot). The Vista preinstallation environment (VistaPE) manufacturing OS is a lightweight version of the Windows Vista operating system that is used for deployment of information handling systems. The VistaPE manufacturing OS is used during an installation phase of Windows, and can be booted via CD-ROM, USB flash drive or hard disk. The VistaPE manufacturing OS is used to preinstall Windows client operating systems to information handling systems during manufacturing).

Next the system 400 determines any environment variables and parses a software descriptor record (SDR) for hardware, software and into parts at step 420. The SDR is a text file that contains information about the hardware and software to be loaded on the system. Next, the system 400 checks the information handling system for an EI.XML file at step 430. If the EI.XML file does not exist, then at step 438 the system 400 uses a known process for installing an image according to an original SDR associated with the information handling system.

If the EI.XML file does exist on the information handling system then the system 400 searches for all active images within the EI.XML file at step 440. Active images are images where the current date is less than an invalid date stored within the EI.XML file (i.e., images which are current). Next, at step 445, for each active image, the system 400 compares environment variables and SDR entries to criteria included within the EI.XML file. The Embedded Image XML file contains a list of criteria needed to make a replacement. The criteria include any information included in the SDR or any environment variable set up for the system. The SDR contains a list of software items, hardware items and information lines. Any of these entries can be used as criteria for a replacement. For example, the EI XML file may indicate that a replacement can only be made if the SDR includes the specific software entry for a version of Office, a specific software entry for a version of a DVD playback software, an information line indicating that the order is a retail order and a hardware line indicting the presence of a DVD drive. In addition, in the download environment, certain environment variables are set up for the procedure. These environment variables can also be used as criteria. For example, there are environment variables that indicate platform, operating system type, operating system language and service pack. As such, the EI XML file could indicate that a replacement could only be made for a certain portable system having a certain operating system with a certain language (e.g., a Dell Latitude E6400 type portable with a Vista Operating System and an English Service Pack).

If there are no matches as determined by step 450, then at step 438 the system 400 uses a known process for installing an image according to an original SDR associated with the information handling system. If there is a match as determined by step 450, then the system 400 determines whether all active SRVs in the additions section of the EI.XML file are accessible and valid at step 455. If there are no accessible and valid SRVs as determined by step 455, then at step 438 the system 400 uses a known process for installing an image according to an original SDR associated with the information handling system.

If there are accessible and valid SRVs, then the system adds the SRVs to the SDR that is located within the additions section of the EI.XML file at step 460. Next, at step 470, the system 400 removes all SRVs from the SDR that are in the removal section of the EI.XML file. Next, at step 480, the system 400 continues the download process with the modified SDR containing the embedded image.

The embedded system process allows installation of software while still allowing for full configurability. For example, a customer can choose whatever software they want installed on their system. In one example, assume a customer chooses software items A, B, C, and D. With known installation processes, those items are installed one at a time in a manufacturing environment on that customer's system (e.g., A installs, then B installs, then C installs, and then D installs.) Each installation takes time because it has to be set up for that system. With the present embedded system imaging process, a system manufacturer analyzes relevant data and determines that software items A, B, and C are selected together by customers a large number of times or that they will likely be included in some upcoming retail build or other large order. Based upon this determination, in a development environment, the embedded system processes and identifies tools to run the install of A, B, and C on a generic system and captures an image of that, (e.g., which may be identified as item Z). Because the installs were executed in a development environment and an image was captured, the time it takes to run the installs does not occur when the image is deployed to a customer's system. Now, if a customer orders a system having software A, B, C, and D, the embedded system process replaces A, B, and C in the order with Z, leaving the order to contain Z and D. The image of Z is deployed to the customer's system and then only item D has to execute through an install, thus saving time over running the install for everything. In addition, if a different customer orders A, B, C, and E, the process still works. In that case, A, B, and C are replaced with Z leaving Z and E in the order, so that only E has to execute through installation.

Another advantage of this process is that the systems can still run through a known layered process for installing software and making customizations on each specific customer's system for their configuration. The embedded imaging system uses commonly bundled items or pre-identified items and creates an image of these items in a pre-installed state to use as a base to speed up the process and then dynamically handles the replacement during the execution in the manufacturing environment.

Referring to FIGS. 5A and 5B, an example XML file 500 for the embedded imaging system is shown. This example XML file shows examples of the invalid date information 510, info Part information 520, SRV information 530 as well as removal information 540 and addition information 550.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Also for example, the above-discussed embodiments include software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably, or remotely coupled to a microprocessor/memory system. Thus, the modules may be stored within a computer system memory to configure the computer system to perform the functions of the module. Other new and various types of computer-readable storage media may be used to store the modules discussed herein. Additionally, those skilled in the art will recognize that the separation of functionality into modules is for illustrative purposes. Alternative embodiments may merge the functionality of multiple modules into a single module or may impose an alternate decomposition of functionality of modules. For example, a software module for calling sub-modules may be decomposed so that each sub-module performs its function and passes control directly to another sub-module.

Consequently, the invention is intended to be limited only by the spirit and scope of the appended claims, giving full cognizance to equivalents in all respects.

What is claimed is:

1. A method for installing a software onto an information handling system comprising:
    generating a request for a post-configured image, the post-configured image comprising an operating system, drivers and application software, the request being generated in response to actual demand for the post-configured image;
    creating, via an information handling system, the post-configured image; and,
    installing, via the information handling system, the post-configured image onto a plurality of target information handling systems while allowing additional software to be layered on top of the post-configured image using a layered software installation process; and wherein
    the actual demand ensuring that the post-configured image directly impacts provision of fixed images on information handling systems.

2. The method of claim 1 wherein:
    the actual demand for the post-configured image is identified via one of a manufacturing organization, a marketing organization and a sales team.

3. The method of claim 2 wherein:
    the manufacturing organization uses build data to project where an embedded image is needed; and,
    the marketing organization and sales teams have advance knowledge of when any large retail builds are planned.

4. The method of claim 2 wherein:
    when the request has been received, an automated download process creates an embedded image.

5. The method of claim 4 wherein:
    embedded image python scripts perform all of the actions to create the embedded image.

6. An apparatus for installing a fixed image onto an information handling system comprising:

means for generating a request for a post-configured image, the post-configured image comprising an operating system, drivers and application software, the request being generated in response to actual demand for the post-configured image;

means for creating the post-configured image; and, means for installing the post-configured image onto a plurality of target information handling systems while allowing additional software to be layered on top of the post-configured image using a layered software installation process; and wherein the actual demand ensuring that the post-configured image directly impacts provision of fixed images on information handling systems.

7. The apparatus of claim 6 wherein:

the actual demand for the post-configured image is identified via one of a manufacturing organization, a marketing organization and a sales team.

8. The apparatus of claim 7 wherein:

the manufacturing organization uses build data to project where an embedded image is needed; and, the marketing organization and sales teams have advance knowledge of when any large retail builds are planned.

9. The apparatus of claim 7 wherein:

when the request has been received, an automated download process creates an embedded image.

10. The apparatus of claim 9 wherein:

embedded image python scripts perform all of the actions to create the embedded image.

* * * * *